(12) United States Patent
Blersch et al.

(10) Patent No.: US 8,572,997 B2
(45) Date of Patent: Nov. 5, 2013

(54) POSITIONING FOOT UNIT OF A DOMESTIC APPLIANCE

(75) Inventors: Dietmar Blersch, Ertingen (DE); Klaus Arnold, Erlenmoos-Eichbühl (DE); Oliver Weidelener, Alleshausen (DE)

(73) Assignee: Liebherr-Hausgerate Ochsenhausen GmbH, Ochsenhausen (DE)

(*) Notice: Subject to any disclaimer, the term of this patent is extended or adjusted under 35 U.S.C. 154(b) by 1082 days.

(21) Appl. No.: 11/920,667

(22) PCT Filed: May 18, 2006

(86) PCT No.: PCT/EP2006/004734
§ 371 (c)(1),
(2), (4) Date: Aug. 2, 2010

(87) PCT Pub. No.: WO2006/122811
PCT Pub. Date: Nov. 23, 2006

(65) Prior Publication Data
US 2010/0300138 A1    Dec. 2, 2010

(30) Foreign Application Priority Data

May 19, 2005  (DE) ..................... 20 2005 007 883 U
Aug. 10, 2005  (DE) ..................... 20 2005 012 626 U

(51) Int. Cl.
*F25D 19/00*  (2006.01)
(52) U.S. Cl.
USPC ........................................... 62/297
(58) Field of Classification Search
USPC .................. 62/440, 297; 248/157; 312/249.1
See application file for complete search history.

(56) References Cited

U.S. PATENT DOCUMENTS

| 1,006,974 | A |   | 10/1911 | Moore et al. |
| 2,874,971 | A | * | 2/1959  | Devery ........................... 280/46 |
| 3,071,887 | A | * | 1/1963  | Von Arb ......................... 248/651 |
| 3,186,670 | A |   | 6/1965  | Perl |
| 3,814,363 | A | * | 6/1974  | Brelosky .................... 248/188.4 |
| 3,927,853 | A |   | 12/1975 | Guth |
| 4,789,121 | A |   | 12/1988 | Gidseg et al. |
| 4,858,865 | A |   | 8/1989  | Schrepfer |
| 4,991,805 | A |   | 2/1991  | Solak et al. |
| 4,995,569 | A |   | 2/1991  | Alexander |
| 5,749,550 | A |   | 5/1998  | Jackson |

FOREIGN PATENT DOCUMENTS

| DE | 1437696 | 3/1966 |
| DE | 2037379 | 1/1972 |
| DE | 7309125 | 7/1973 |

(Continued)

*Primary Examiner* — Melvin Jones
(74) *Attorney, Agent, or Firm* — Dilworth & Barrese LLP

(57) ABSTRACT

An adjustment foot unit of a domestic appliance, in particular an adjustment foot unit of a refrigerator unit and/or freezer unit, has a vertical adjustment device having a rotatable rod and a spindle rotatably supported in a housing and having a thread at least sectionally, with the rod and the spindle being connected to one another such that a rotation of the rod results in a rotation of the spindle, having an adjustment unit, in particular a nut, which is arranged rotationally fixedly and has a thread which is in engagement with the thread of the spindle as well as having a foot part displaceable relative to the housing, with the foot part and/or the adjustment unit having a sloped plane in which the adjustment unit is in contact with the foot part.

21 Claims, 2 Drawing Sheets

(56) References Cited

FOREIGN PATENT DOCUMENTS

| | | |
|---|---|---|
| DE | 7708812 | 9/1977 |
| DE | 8506152.2 | 5/1985 |
| DE | 3604838 | 8/1987 |
| DE | 4343709 | 6/1995 |
| DE | 19606460 | 8/1997 |
| DE | 19909544 | 9/2000 |
| WO | 96/37729 | 11/1996 |

* cited by examiner

POSITIONING FOOT UNIT OF A DOMESTIC APPLIANCE

The invention relates to an adjustment foot unit of a domestic appliance, in particular of a refrigerator unit and/or freezer unit.

Height adjustment devices for feet of domestic appliances are known in numerous different embodiments.

BACKGROUND OF THE INVENTION

A vertical adjustment device for feet of a refrigerator unit is known from U.S. Pat. No. 4,991,805 which has a rotatably arranged adjustable rod whose end region is rotationally fixedly connected to a gear wheel. The gear wheel in turn meshes with a nut whose internal thread is in engagement with the external thread of a threaded rod connected to the foot part. A rotation of the nut results in a positional change of the foot and thus in a vertical adjustment of the unit.

A vertical adjustment device in which the rotation of an actuation rod is transmitted by means of a worm gear and results in an axial adjustment movement of the foot part is known from DE 196 06 460.

U.S. Pat. No. 4,789,121 relates to a vertical adjustment device of a refrigeration unit having a threaded rod accessible from the operating side of the unit. The vertical adjustment device furthermore has a foot which is pivotably supported on the housing of the refrigeration unit and in which a nut meshing with the threaded rod is rotationally fixedly located. A rotation of the threaded rod results in an axial displacement of the nut relative to the thread rod and thus to the pivoting of the foot around a pivot axis arranged in a stationary manner. A vertical adjustment device having a pivotably supported foot is furthermore known from U.S. Pat. No. 5,749,550. In this arrangement, the pivotably supported foot cooperates with a tie rod whose position is adjustable via a threaded rod. If the threaded rod is actuated, it results in a change in the position of the tie rod and thus to a pivoting of the foot. The pivot movement of the foot results in a vertical adjustment of the unit.

Vertical adjustment devices are known from U.S. Pat. No. 4,955,569; U.S. Pat. No. 3,186,670 and U.S. Pat. No. 3,071,887 in which the rotation of an actuation rod accessible from the operating side of the unit has the result that an adjustment element cooperating with a sloped plane is moved such that the position of the adjustment element relative to the sloped plane is changed, with the vertical position of the unit changing accordingly.

U.S. Pat. No. 3,750,989 discloses a vertical adjustment device of a domestic appliance which has a rotatable adjustment rod accessible from the operating side. Its thread is in engagement with the internal thread of a nut which is arranged rotationally fixedly in a pivotably arranged foot of the unit. A rotation of the rod results in an axial movement between the nut and the rod and thus to a pivot movement of the foot. U.S. Pat. No. 3,927,853 likewise relates to a vertical adjustment device of a unit having a pivotably arranged foot. Its pivot angle, and thus the vertical position of the unit, is determined by the position of a wedge-shaped element which can be retracted between the pivotable foot and the housing. Its movement is controlled from the operating side of the unit by means of a rod or a wire.

DE 36 04 838 and DE 43 43 709 relate to vertical adjustment devices for feet of domestic appliances which are actuated by means of a flexible shaft accessible from the operating side or from a side wall of the unit.

Vertical adjustment devices are known from the aforesaid prior art in which the actuation rods serve as pull rods and push rods which conduct the forces acting on the feet due to the weight of the appliance into the front region of the domestic appliance. The reaction forces have to be taken over by the total appliance frame.

SUMMARY OF THE INVENTION

It is the object of the invention to further develop an adjustment foot unit of the initially named kind such that the actuation rod does not have to absorb any pulling or pushing forces.

This object is satisfied by a foot of a domestic appliance having the features herein. Provision is accordingly made for the vertical adjustment device to have a rotatable rod and a spindle which is rotatably supported in a housing and which has a thread at least sectionally. The rod and the spindle are connected to one another such that a rotation of the rod results in a rotation of the spindle. Furthermore a rotationally fixedly arranged adjustment unit or nut is provided which has a thread which is in engagement with the thread of the spindle. Finally, a foot part displaceable relative to the housing is provided, with the foot part and/or the adjustment unit having a sloped plane in which the adjustment unit is in contact with the foot part.

On a rotation of the spindle by the rod, a displacement of the adjustment unit or nut on the spindle is initiated. Due to the sloped plane forming the contact surface between the nut and the foot part, a push-in or push-out movement of the foot part relative to the housing and thus a vertical adjustment of the total domestic appliance is initiated.

The reaction forces of the vertical load induced by the appliance weight are absorbed by the housing of the adjustment foot unit.

The housing of the adjustment foot unit is located in the region of the foot part in a preferred embodiment and preferably does not extend over the total longitudinal or transverse sides of the apparatus.

The adjustment unit or nut in accordance with the invention is thus configured as a slider which carries out a sliding movement relative to the foot part on rotation of the spindle.

Provision is made in a further embodiment of the invention that the spindle has an external thread which is in engagement with an internal thread of the nut or of the slider.

In accordance with a further embodiment of the invention, a releasable connection, in particular a plug-in coupling, is provided between the rod and the spindle which connects the two components to one another without any further connection members. An unreleasable connection is also conceivable. A one-piece design of the rod and the spindle is likewise covered by the invention, i.e. both members are formed by the same component.

The spindle is arranged horizontally in a preferred embodiment of the invention. It is preferably arranged at two mutually spaced apart positions in the axial direction of the spindle between which the spindle has a section with an external thread on which the nut runs.

In a further embodiment of the invention, the foot part can be pushed at least partly into the housing. In a preferred embodiment of the invention, the foot part is pushed into the housing from below and the relative position of the nut and the foot part is determined via the vertical position of the foot part and thus also via the vertical position of the domestic appliance.

In a further embodiment of the invention, an axle on which a roller is rotatably supported is arranged in the foot part. In this manner, a rolling adjustment foot can be provided which ensures in every position of the foot part that when the domestic appliance is installed, a careful rolling movement can be carried out which protects the floor covering from damage.

Provision is made in a further embodiment of the invention that the foot part is received in the housing in a shape matched manner such that a rotation of the foot part relative to the housing around a vertical axis is not possible or is only possible to a restricted extent. The foot part is thus guided in a shape matched manner in the housing. It can preferably be pushed into and out of the housing, but cannot be rotated relatively in the housing.

The adjustment unit can have a bore with an internal thread in which the spindle is rotatably received, with the adjustment unit having a surface forming the sloped plane which is inclined with respect to the longitudinal axis of the bore. With a horizontally arranged spindle, the bore is likewise arranged horizontally and the surface of the adjustment unit with which it is connected to the foot part is inclined with respect to the longitudinal axis of the spindle or of the bore.

Provision is made in a further embodiment of the invention for the rod to have a tool mount in its one end region for the purpose of the rotation of the rod by means of a tool. In a preferred embodiment, the tool mount is suitable both for an outward drive and for an inward drive so that a plurality of drive options are available.

To prevent the spindle from moving out of the housing after reaching the bottommost position of the foot part by a further rotation of the rod, a securing member can be provided which secures the spindle against axial displacement and always holds it in its desired axial position. In this context, it can, for example, be a spring which is arranged at the housing in a preferred embodiment of the invention.

The invention further relates to a refrigerator unit and/or a freezer unit having a foot adjustment device in accordance with the description herein.

Provision is preferably made for an end of the rod to extend in the region of the front side, preferably in the region of the base board of the appliance. It is possible in this fashion to carry out the operation of the foot with a vertical adjustment device in accordance with the invention in a comfortable manner from the front side of the appliance.

The refrigerator unit and/or freezer unit can have a plurality of feet of which one, a plurality or all of them is/are made in accordance with the description herein.

In a further embodiment of the invention, the refrigerator unit and/or freezer unit has one or more feet facing toward the operating side of the appliance and one or more feet facing toward the rear side of the appliance, with at least one or a plurality of the fee facing the rear side of the appliance being made in accordance with the description herein.

BRIEF DESCRIPTION OF THE DRAWINGS

Further details and advantages of the invention will be explained with reference to an embodiment shown in the drawing. There are shown.

DESCRIPTION OF THE PREFERRED EMBODIMENTS

Figure 1:
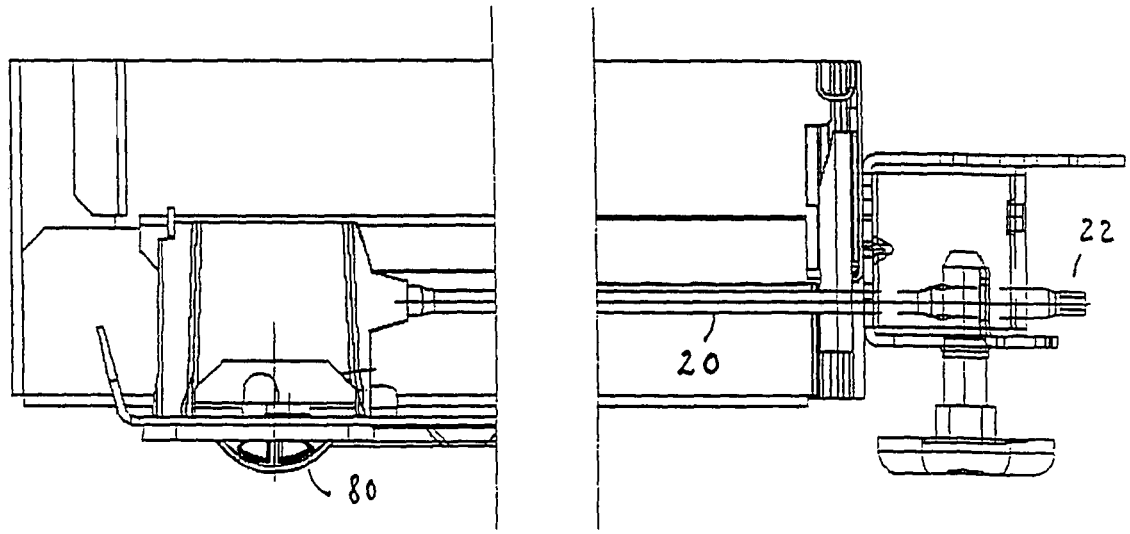
FIG. 1: a side view of a refrigerator unit and/or freezer unit having a front-side foot and a rearward adjustment foot unit in accordance with the invention.

FIG. 1 shows, in a side view, the lower region of a refrigerator unit and/or freezer unit whose rearward section is located at the left in accordance with FIG. 1 and whose front side section is located at the right in accordance with FIG. 1. A base board is located in the front side region of the appliance shown at the right, said base board taking over the front side support of the appliance via a foot. A rotatable rod 20 extends from the front side up to the foot arranged in the rearward region and has a tool mount in its end region 22 which is shown at the right and is accessible from the front side and a corresponding tool can be placed onto said tool mount for the rotation of the rod 20. A shape matched outward and inward drive, which extends on the front side in the base board region of the appliance toward the operating side, can be provided as drive options. If a plurality of drives are provided, a plurality of options are accordingly available to the user to carry out a vertical adjustment. Box wrenches, hexagon wrenches, torx wrenches, etc., can be considered, for example.

As can furthermore be seen from FIG. 1, the rear adjustment feet are formed by rollers 80, as will be explained in detail with respect to FIG. 2.

Figure 2:
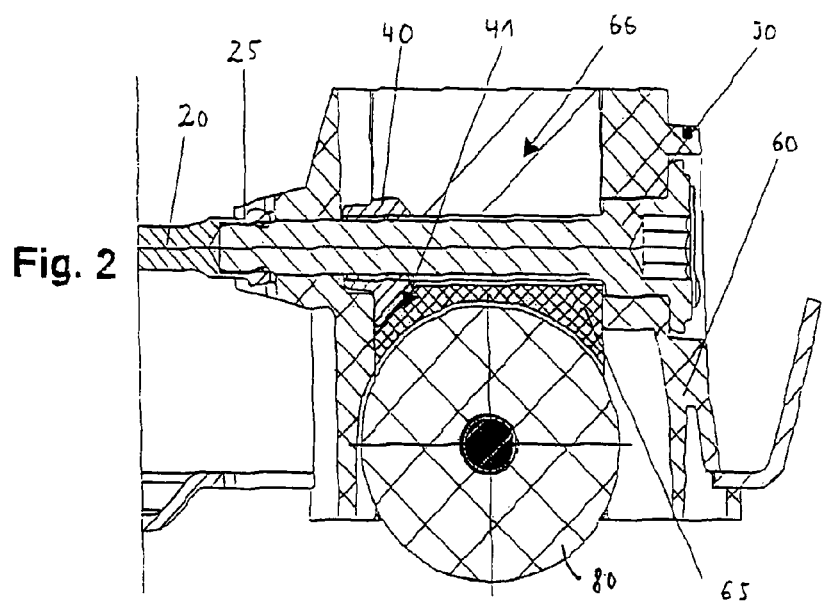
FIG. 2: a sectional representation through the adjustment foot unit in accordance with the invention.

FIG. 2 shows the rear end region of the rod 20 which faces away from the operator side and which is in connection with a spindle 30 via a plug coupling 25. Both the rod 20 and the spindle 30 are rotatable. The plug coupling 25 is configured such that it transfers the torque applied by rotating the rod 20 to the spindle 30. Angular offsets are also conceivable to ensure an optimum positioning in the front region of the domestic appliance. The rod 20 remains arranged in an axial fixed position during rotation.

The spindle 30 is supported horizontally in the housing 60 in its two end regions. The spindle has an external thread between these two support regions, said external thread meshing with the internal thread of an adjustment unit or nut 40.

The rotation of the spindle 30 results in a movement of the adjustment unit 40 in the axial direction. On its lower side, the adjustment unit 40 has an obliquely arranged slide surface 41, that is a slide surface inclined with respect to the horizontal. The slide surface 41 slides on the parallel surface 66 of the foot part 65 which is inserted into the housing 60 from below, as can be seen from FIG. 3.

The surfaces 41 and 66 convert the horizontal movement which occurs on a rotation of the spindle 30 in accordance with the principle of the sloped plane into a vertical movement which corresponds to the vertical adjustment of the appliance.

The slide piece or the adjustment unit 40 is arranged such that it is secured against rotation. This is established, on the one hand, via the surface pressure in the slide surface pair 41, 66 caused by the weight force and, on the other hand, via a shape match by the construction design of the parts to be paired.

The foot part 65 which moves vertically on a rotation of the spindle 30 receives an axle 50 in its lower section and the roller 80 is rotatably supported on said axle. The feet in accordance with the invention thus remain rollingly movable in any vertical position.

Figure 3:
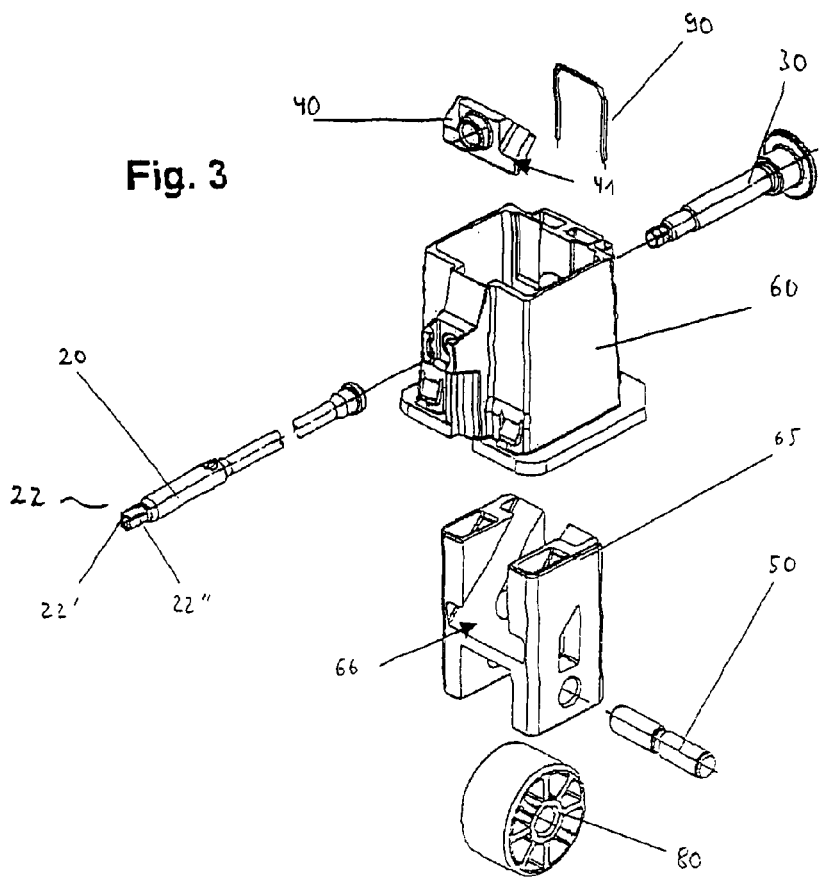
FIG. 3: an exploded representation of the adjustment foot unit in accordance with the invention.

As can be seen from FIG. 3, the hollow space surrounded by the housing 60 and the foot part 65 are made rectangular. The has the result that a rotation of the foot part 65 in the housing 60 is not possible. The rotational degree of freedom of the wheel is predetermined via the shape matched guidance of the foot part 65 in the housing 60.

FIG. 3 shows the described arrangement in an exploded representation. The plane 66 of the foot part inclined with respect to the horizontal and also the sloped plane 41 of the adjustment unit 40 can again be seen from this. Both surfaces 41, 66 act together and are arranged parallel to one another when the longitudinal axis of the bore of the adjustment unit 40 is aligned with the longitudinal axis of the spindle 30.

The reference numeral 90 marks a spring which holds the spindle 30 in the housing 60 if an attempt is made to further rotate the spindle 30 after the bottommost position has been reached.

As can be seen from FIGS. 1 to 3, the reaction forces of the vertical load applied by the weight of the appliance are only absorbed in the base housing 60. No strain on the total domestic appliance frame is thus provided.

Deviating from the prior art, it must furthermore be stated that in accordance with the invention the rod 20 only undergoes torsion, that is neither pulling nor pressing, on actuation of the apparatus.

A further advantage of the invention results from the fact that, in the adjustment process, that is on the rotation of the spindle 30 by means of the rod 20, a purely vertical movement is carried out which takes place independently of the quality of the floor. No horizontal displacement of the appliance by an adjustment of the height is caused by this type of vertical adjustment.

The individual parts of the adjustment foot unit in accordance with the invention are predominantly made as plastic and extrusion parts in a technical production respect. Advantageous savings with respect to assembly can thereby be achieved. The number of parts is moreover reduced by snap connections which can be realized in the plastic parts. In this context, the connection must in particular be mentioned which connects the rod 20 to the adjustment spindle 30 at the coupling point 25 without further connection members.

The pressed on, elevated shape members on the rod 20 as well as on the spindle 30 as well as the inner drive of the spindle 30 located on the side remote from the operator must named as assembly aids.

The arrangement in accordance with the invention is naturally also conceivable without a wheel 80. A rigid adjustment foot is also covered by the invention.

It is furthermore conceivable that the shape matched guidance between the foot part 65 and the housing 60 is not realized via the shape of both parts, but by means of the foot 65 as well as by the spindle 30 dipping through the foot part 65.

The system in accordance with the invention can be an adjustment foot concept in modular design for domestic appliances. This module system provides that a decision is made at the final assembly or by the customer himself whether rigid or vertically adjustable adjustment feet should be used. This is achieved in that, on the one hand, an adjustment foot unit with a vertically adjustable wheel and an adjustment foot unit with a wheel not vertically adjustable, on the other hand, can be mounted in the domestic appliance. Optimized lower production costs and, for the consumer, a wider range matched to the needs of the consumer are thereby possible.

The invention is preferably conceived for use of the adjustment feet located in the rear region at the appliances. The invention can, however, naturally also be used in a different region, for example with front-side feet.

The invention claimed is:

1. An adjustment foot unit (10) of a domestic appliance, in particular an adjustment foot unit (10) of a refrigerator unit and/or freezer unit, comprising a vertical adjustment device having a rotatable rod (20) and a spindle (30) rotatably supported in a housing (60) and having a thread at least sectionally, with the rod (20) and the spindle (30) being connected to one another such that a rotation of the rod (20) results in a rotation of the spindle (30), comprising an adjustment unit, in particular a nut (40), which is arranged rotationally fixedly and has a thread which is in engagement with the thread of the spindle (30) as well as comprising a foot part (65) displaceable relative to the housing (60), with the foot part (65) and/or the adjustment unit having a sloped plane in which the adjustment unit is in contact with the foot part (65), wherein the rod (20) has a tool mount in its one end region (22) for the purpose of the rotation of the rod (20) by means of a tool.

2. An adjustment foot unit (10) in accordance with claim 1, wherein the spindle (30) has an external thread and the adjustment unit is made as a nut (40) with an internal thread.

3. An adjustment foot unit (10) in accordance with claim 1, wherein the rod (20) and the spindle (30) are unreleasably connected to one another, for example are made in one piece; or the connection is a releasable connection, for example a plug coupling (25).

4. An adjustment foot unit (10) in accordance with claim 1, wherein the spindle (30) is supported at two mutually spaced apart positions in the axial direction of the spindle (30) in the housing (60); and the spindle (30) has an external thread in the section located between the bearings.

5. An adjustment foot unit (10) in accordance with claim 1, wherein the foot part (65) can be pushed at least partly into the housing (60).

6. An adjustment foot unit (10) in accordance with claim 1, wherein an axle (50) is arranged in the foot part (65) and a roller (80) is rotatably supported on said axle.

7. An adjustment foot unit (10) in accordance with claim 6, wherein the foot part (65) is received in the housing (60) in a shape matched manner such that a rotation of the foot part (65) relative to the housing (60) around a vertical axis is bounded or prohibited.

8. An adjustment foot unit (10) in accordance with claim 1, wherein the adjustment unit or nut (40) has a bore with an internal thread in which the spindle (30) is rotatably received; and the nut (40) has a surface forming a sloped plane which is inclined with respect to the longitudinal axis of the bore.

9. An adjustment foot unit (10) in accordance with claim 1, wherein a securing member is provided which secures the spindle (30) against axial displacement.

10. An adjustment foot unit (10) in accordance with claim 9, wherein the securing member is made as a spring (90).

11. A refrigerator unit and/or a freezer unit having an adjustment foot unit in accordance with claim 1.

12. A refrigerator unit and/or a freezer unit in accordance with claim 11, wherein an end of the rod (20) extends in the region of the front side, preferably in the region of the base board of the appliance.

13. A refrigerator unit and/or a freezer unit in accordance with claim 11, wherein the refrigerator unit and/or freezer unit has a plurality of feet of which one, a plurality or all of them is/are made as an adjustment foot unit.

14. A refrigerator unit and/or a freezer unit in accordance with claim 1, wherein the refrigerator unit and/or freezer unit has one or more feet facing the operating side of the appliance and one or more feet facing the rearward side of the appliance; and at least one or a plurality of the feet facing the rear side of the appliance is made as an adjustment foot unit.

15. An adjustment foot unit (10) in accordance with claim 2, wherein the rod (20) and the spindle (30) are unreleasably connected to one another, for example are made in one piece; or the connection is a releasable connection, for example a plug coupling (25).

16. An adjustment foot unit (10) in accordance with claim 15 and further including bearings, wherein the spindle (30) is supported at two mutually spaced apart positions in the axial direction of the spindle (30) in the housing (60); and the spindle (30) has an external thread in the section located between the bearings.

17. An adjustment foot unit (10) in accordance with claim 2 and further including bearings, wherein the spindle (30) is supported at two mutually spaced apart positions in the axial direction of the spindle (30) in the housing (60); and the spindle (30) has an external thread in the section located between the bearings.

18. An adjustment foot unit (10) in accordance with claim 3 and further including bearings, wherein the spindle (30) is supported at two mutually spaced apart positions in the axial direction of the spindle (30) in the housing (60); and the spindle (30) has an external thread in the section located between the bearings.

19. An adjustment foot unit (10) in accordance with claim 15, wherein the foot part (65) can be pushed at least partly into the housing (60).

20. An adjustment foot unit (10) of a domestic appliance, in particular an adjustment foot unit (10) of a refrigerator unit and/or freezer unit, comprising a vertical adjustment device having a rotatable rod (20) and a spindle (30) rotatably supported in a housing (60) and having a thread at least sectionally, with the rod (20) and the spindle (30) being connected to one another such that a rotation of the rod (20) results in a rotation of the spindle (30), comprising a nut (40) which is arranged rotationally fixedly and has a thread which is in engagement with the thread of the spindle (30) as well as comprising a foot part (65) displaceable relative to the housing (60), with the foot part (65) and the nut each having a sloped plane beneath the spindle (30) in which the nut (40) is in contact with the foot part (65).

21. The adjustment foot unit (10) of claim 20 wherein the rod (20) and the spindle (30) are connected to one another by a plug coupling (25) which transfers torque from the rod (20) to the spindle (30).

* * * * *